No. 815,408. PATENTED MAR. 20, 1906.
G. W. CRANE.
SHREDDER FEEDER.
APPLICATION FILED JUNE 5, 1905.
2 SHEETS—SHEET 1.
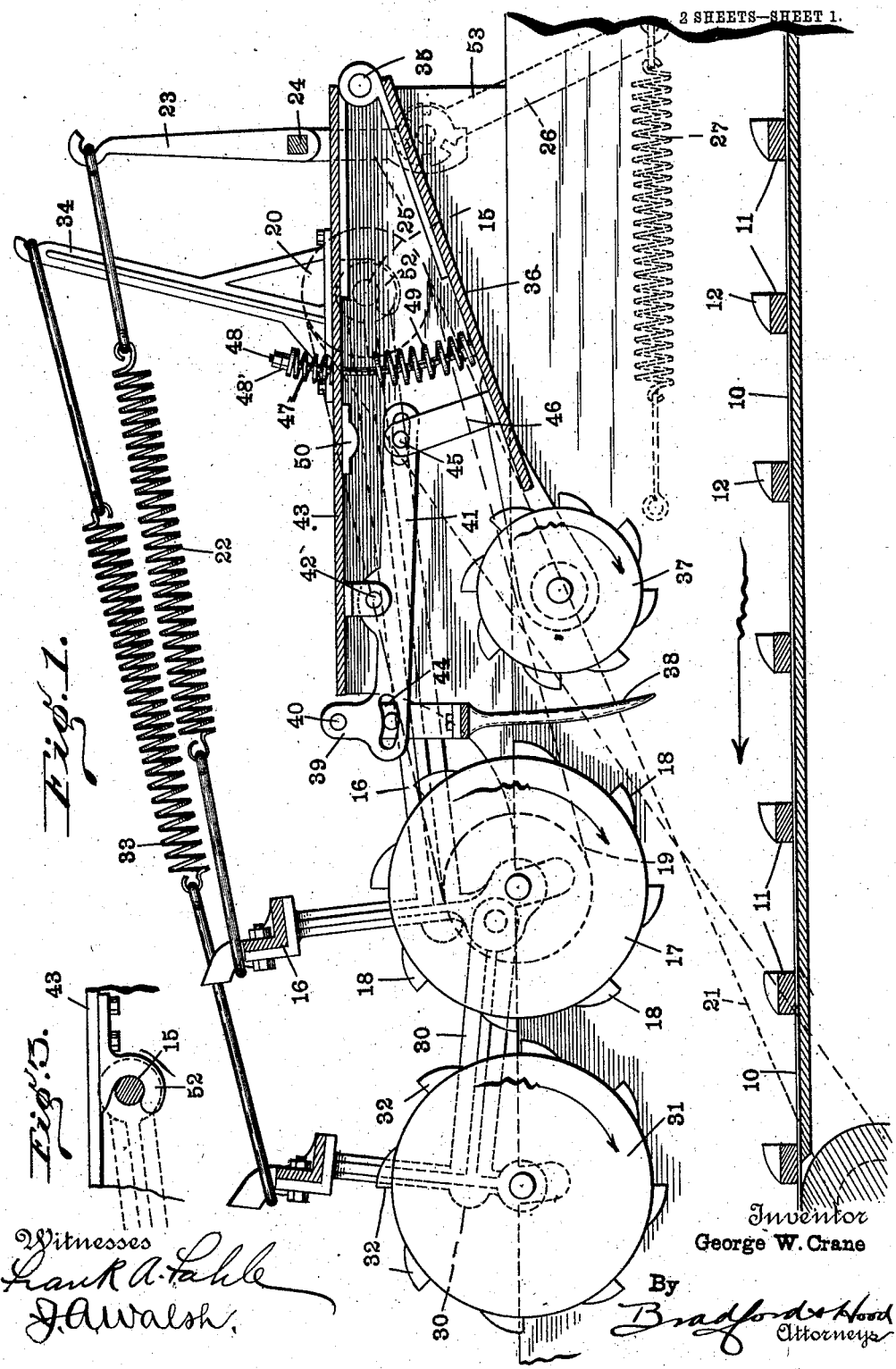
Witnesses
Frank A. Fahle
J. A. Walsh.
Inventor
George W. Crane
By
Bradford & Hood
Attorneys No. 815,408. PATENTED MAR. 20, 1906.
G. W. CRANE.
SHREDDER FEEDER.
APPLICATION FILED JUNE 5, 1905.
2 SHEETS—SHEET 2.
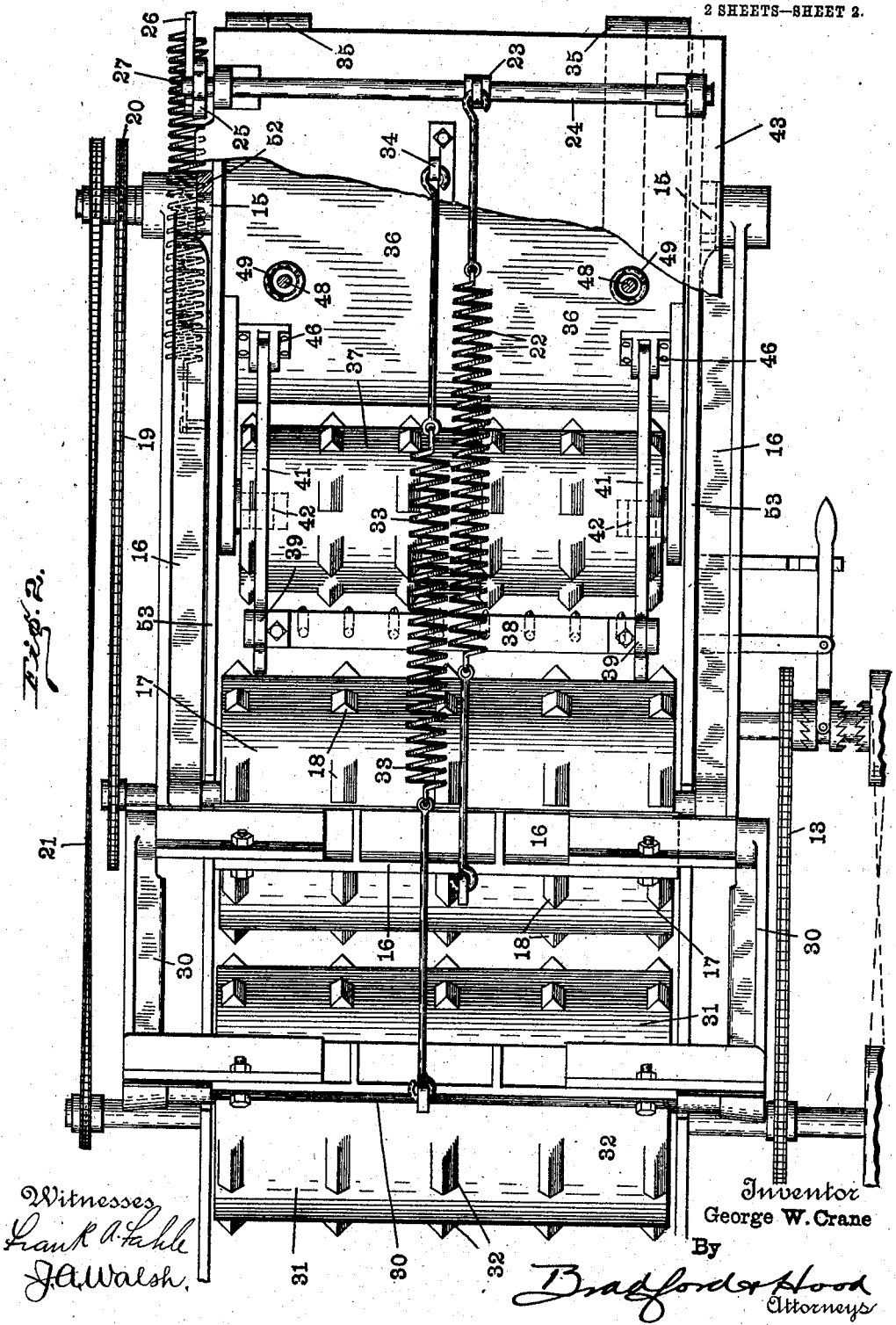
Witnesses
Frank A. Fahle
J. A. Walsh.
Inventor
George W. Crane
By
Bradford & Hood
Attorneys

UNITED STATES PATENT OFFICE.

GEORGE W. CRANE, OF VEEDERSBURG, INDIANA.

SHREDDER-FEEDER.

No. 815,408.    Specification of Letters Patent.    Patented March 20, 1906.

Application filed June 5, 1905. Serial No. 263,861.

*To all whom it may concern:*

Be it known that I, GEORGE W. CRANE, a citizen of the United States, residing at Veedersburg, in the county of Fountain and State of Indiana, have invented certain new and useful Improvements in Shredder-Feeders, of which the following is a specification.

The object of my invention is to produce a feeder, more especially designed for corn-shredders, by means of which the fodder may be fed to a shredder uniformly and evenly, the arrangement being such as to prevent slugging of the shredder.

The accompanying drawings illustrate my invention.

Figure 1 is a central vertical section; Fig. 2, a plan with part of the cover-board omitted, and Fig. 3 a detail of the bracket for supporting the first feed-roll frame.

In the drawings, 10 indicates an endless carrier provided with cross-slats 11 and upwardly-projecting lugs 12, said conveyer being driven by any suitable means—such, for instance, as the reversing driving-gearing 13, which is described and claimed in my Patent No. 740,245. The conveyer 10 is generally built to form part of a shredder and discharges to the snapping-rollers in the usual manner.

Pivoted at 15 above the conveyer 10 is a frame 16, which extends rearwardly and carries at its free end a feed-roller 17, which is provided on its periphery with a plurality of transversely-separated lugs 18, which straighten the stalks on the carrier 10 and prevent them from being fed crosswise to the snapping-rollers. The roller 17 is driven in the direction indicated by the arrow in Fig. 1 by any suitable means—such, for instance, as a sprocket-chain 19, leading back to an idler 20, journaled on one of the pivots 15, and a sprocket-chain 21, connecting said idler with the forward shaft of the conveyer 10. In arranging the driving connection for the roller 17 I prefer to make the peripheral speed of the roller 17 slightly less than the speed of the conveyer 10 in order that the roller 17 may thus operate as a slight drag upon the upper portion of the bed of fodder to allow the under part of the fodder-bed to feed to the snapping-rollers a little in advance of the upper portion, so that the ears of corn carried by the lower portion of the fodder-bed will get out of the way before the upper portion of the bed reaches the snapping-rollers. In order to prevent drag on the feeder, however, when the upper portion of the fodder-bed is engaged by the snapping-rollers, and thus drawn more rapidly to the rear, I prefer to drive the roller 17 by a ratchet driving connection, such as shown and claimed in my pending application, Serial No. 213,679, which connection is of such character that when the snapping-rollers engage the upper stalks of the fodder-bed and pull them forward at a speed greater than the speed of the drive of the roller 17 said roller 17 may thus be given a peripheral speed substantially equal to the movement of the stalks caused by the action of the snapping-rollers.

The weight of the frame 16 is partially supported by means of a spring 22, one end of which is attached to the frame 16 and the other end of which is attached to an arm 23, carried by a shaft 24, journaled on the cover-board 43. Shaft 24 carries an arm 25, which projects downward and has adjustably attached to it an arm 26, which extends forward and downward and is provided at its end with a hook adapted to receive one end of a spring 27, which acts, in conjunction with the spring 22, to assist in supporting a portion of the weight of the frame 16.

Pivoted to the frame 16 and extending rearwardly therefrom is a roller-frame 30, which carries at its rear end a pressure-roller 31, equipped with teeth 32, similar to the teeth 18 on roller 17. The weight of frame 30 and roller 31 is partially supported by a spring 33, the forward end of which is attached to a bracket 34, secured to the cover-board 43.

Pivoted at 35 on cover 43 above the conveyer 10 and extending downward and rearward therefrom is a deflector-board 36, the forward end of which carries a roller 37, which rolls upon the top of the fodder-bed as it is carried inward by the conveyer 10.

In order to prevent slugging of the machine by feeding too thick a bed of fodder, I provide between rollers 37 and 17 a stop-rake 38, which is supported by a pair of upwardly-extending arms 39, each of which is pivoted at 40 to a lever 41, pivoted at 42 to the under side of the cover 43. The exact position of the rake-bar 38 between the two rollers 37 and 17 can be adjusted by means of a pin-and-slot adjustment 44. The forward end of lever 41 is connected by a pin-and-slot connection 45 with a bracket 46, attached to the upper side of the deflector-board 36, the arrangement being such that when the rear end of the deflector-board 36 is moved upward by the incoming bed of fodder the rake 38 will be projected downward, so as to thus engage the upper portion of the fodder-bed and prevent it from passing to the rear. So soon, however, as the under portion of the bed is passed forward the upper portion will drop down, consequently permitting the deflector-board to drop down and lift the rake 38 out of the path of movement of the fodder-bed.

A portion of the weight of the deflector-board 36 is supported by a spring 47, the tension of which may be adjusted by suitable nuts 48', carried by a rod 48, attached at its under end to the deflector-board 36. Arranged between board 36 and cover 43 is a spring 49, which will come into engagement with the cover 43 when the deflector-board is raised a sufficient amount, and thus supplement the weight of the deflector-board when it has been moved upward by too great an amount of fodder being fed to the machine. A suitable stop 50 is arranged in the path of movement of each of the brackets 46, so as to prevent an upward movement of the deflector-board which would be sufficient to project the rake-teeth 38 into the path of movement of the lugs 12 of the conveyer 10.

The pivots 15 are supported in crotch-bearings 52, which are carried by the sides of the cover 43, said crotch-bearings being open at their rear sides to receive the pivots, the arrangement being such that springs 22 and 27 serve to keep the pivots 15 in their bearings, but also such that by disconnecting springs 22 and 33 from the frames 16 and 30 said frame may be moved slightly to the rear and then entirely detached from the machine, whereupon the cover 43 may be shifted forward, so as to permit easy access to the shredder, if desired. The frames 16 and 30 may be swung forward upon the pivots 15 and the whole structure, if desired, shifted forward by sliding the board 43.

It will be noticed that by this construction I produce a very compact feeder structure which may be easily attached to any shredder immediately above the usual endless feeder conveyer 10 thereof, it only being necessary to provide the short supplemental sides 53 to support my mechanism.

I claim as my invention—

1. In a feeder, the combination, with a feeding-carrier, of a deflector-board arranged over said carrier and movable toward and from the same, a stop-rake also mounted over the carrier to the rear of the deflector, and intermediate connections between said stop-rake and said deflector-board whereby movement of the deflector-board from the carrier will move the stop-rake toward the carrier.

2. In a feeder, the combination, with a feeding-carrier, of a deflector-board arranged over said carrier and movable toward and from the same, a stop-rake arranged to the rear of said deflector-board over the carrier, a lever supporting said stop-rake at one end and connected at its other end to the deflector-board whereby movement of the deflector-board from the carrier will produce movement of the stop-rake toward the carrier and vice versa.

3. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover to the rear of the deflector, and intermediate connections between said deflector-board and the stop-rake whereby movement of the deflector-board away from the carrier will move the stop-rake toward the carrier and vice versa.

4. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover, intermediate connections between said deflector-board and the stop-rake whereby movement of the deflector-board away from the carrier will move the stop-rake toward the carrier and vice versa, bearing-brackets carried by said cover, a feed-roller frame pivoted in said bearing-brackets, a feed-roller carried by said frame, and a yielding support for said feed-roller frame carried by the cover.

5. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover, intermediate connections between said deflector-board and the stop-rake whereby movement of the deflector-board away from the carrier will move the stop-rake toward the carrier and vice versa, bearing-brackets carried by the cover and having pivot-receiving notches formed in said brackets and open at the rear, a feed-roller frame having pivot-pins adapted to be received in the notches of the bearing-brackets, a feed-roller carried by said frame, and means carried by the cover for supporting the rear end of the feed-roller frame.

6. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover, intermediate connections between said deflector-board and the stop-rake whereby movement of the deflector-board away from the carrier will move the stop-rake toward the carrier and vice versa, bearing-brackets carried by the cover and having pivot-receiving notches formed in said brackets and open at the rear, a feed-roller frame having pivot-pins adapted to be received in the notches of the bearing-brackets, a shaft journaled on the cover, an arm carried by said shaft, a connection between said arm and the rear end of the feed-roller frame, a second arm carried by said shaft opposite the first-mentioned arm, and a spring supporting said second arm, substantially as and for the purpose set forth.

7. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover, intermediate connections between said deflector-board and the stop-rake whereby movement of the deflector-board away from the carrier will move the stop-rake toward the carrier and vice versa, bearing-brackets carried by said cover, a feed-roller frame pivoted in said bearing-brackets, a feed-roller carried by said frame, a yielding support for said feed-roller frame carried by the cover, a shaft journaled on the cover, an arm carried by said shaft, a connection between said arm and the rear end of the feed-roller frame, a second arm carried by said shaft opposite the first-mentioned arm, and a spring supporting said second arm, substantially as and for the purpose set forth.

8. In a feeder, the combination, with a feeding-carrier, of a deflector-board arranged over said carrier and movable toward and from said carrier, a stop-rake arranged to the rear of said deflector-board and also movable toward and from the carrier, intermediate connections between the deflector-board and the stop-rake whereby movement of the deflector-board from the carrier will produce movement of the stop-rake toward the carrier and vice versa, and a spring for normally supporting a portion of the weight of the deflector-board.

9. In a feeder, the combination, with a feeding-carrier and its supporting-frame, of a cover-board adapted to rest upon suitable supports over said carrier, a deflector-board hinged to said cover and projecting rearward and downward toward the carrier, a stop-rake carried by said cover, intermediate connections between said deflector-board and the stop-rake whereby movement of the deflector-board away from the carrier will move the stop-rake toward the carrier and vice versa, bearing-brackets carried by said cover, a feed-roller frame pivoted in said bearing-brackets, a yielding support for said feed-roller frame carried by the cover, a shaft journaled on the cover, an arm carried by said shaft, a connection between said arm and the rear end of the feed-roller frame, a second arm carried by said shaft opposite the first-mentioned arm, a spring supporting said second arm, and a spring arranged to supplement the weight of the deflector-board when it has been deflected through a portion of its movement from the carrier, substantially as and for the purpose set forth.

10. In a feeder, the combination, with a feeding-carrier, of a deflector-board arranged over said carrier and movable toward and from said carrier, a stop-rake arranged to the rear of said deflector-board and also movable toward and from the carrier, intermediate connections between the deflector-board and the stop-rake whereby movement of the deflector-board from the carrier will produce movement of the stop-rake toward the carrier and vice versa, a spring for normally supporting a portion of the weight of the deflector-board, and a spring arranged to supplement the weight of the deflector-board when it has been deflected through a portion of its movement from the carrier.

In witness whereof I have hereunto set my hand and seal, at Indianapolis, Indiana, this 15th day of May, A. D. 1905.

GEORGE W. CRANE. [L. S.]

Witnesses:
ARTHUR M. HOOD,
JAMES A. WALSH.